United States Patent [19]
Holster

[11] Patent Number: 5,330,423
[45] Date of Patent: Jul. 19, 1994

[54] DRIVE SYSTEM

[76] Inventor: Donald J. Holster, 292A North Rocks Road, North Rocks, New South Wales, 2151, Australia

[21] Appl. No.: 975,324

[22] Filed: Nov. 16, 1992

[30] Foreign Application Priority Data

Nov. 15, 1991 [AU] Australia .................. PK 9515

[51] Int. Cl.$^5$ .................................. F16H 59/00
[52] U.S. Cl. ................................. 474/69; 474/28
[58] Field of Search ............ 474/69, 70, 18, 28; 198/804

[56] References Cited

U.S. PATENT DOCUMENTS

| | | |
|---|---|---|
| 4,051,675 | 10/1977 | James . |
| 4,413,723 | 11/1983 | Stobb .................. 474/69 X |
| 4,715,491 | 12/1987 | Elderton . |
| 4,743,223 | 5/1988 | Tokoro et al. .......... 474/69 |
| 4,757,248 | 7/1988 | Fajioka et al. . |
| 4,761,153 | 8/1988 | Morimoto ............. 474/28 |
| 4,881,925 | 11/1989 | Hattori ............. 474/28 X |

*Primary Examiner*—Thuy M. Bui
*Attorney, Agent, or Firm*—Fisher & Associates

[57] ABSTRACT

A drive system for a conveyor belt drive assembly including a motor rotatably connected to the input shaft of a fluid coupling with the output shaft of the fluid coupling being rotatably connectable to the drive assembly. A motor speed controller controls the speed of the motor, so as to cause the drive shaft to maintain a desired torque.

10 Claims, 7 Drawing Sheets

DRIVE SYSTEM

FIELD OF THE INVENTION

The present invention relates to a drive system and particularly a drive system that includes a fluid coupling having a controlled torque output.

The invention has particular application as a drive system for conveyor belts and the like.

BACKGROUND ART

Conventionally, conveyor belt drive systems have been of three types.

A first type works on the basis of direct linkage between an electric motor and an output drive shaft, where there is no fluid coupling therebetween. The torque on the drive shaft is controlled directly by the electric motor and there is no means located along the linkage for further affecting the torque.

The disadvantage of this type of drive system is that it may be necessary to oversize the motor to accommodate the heating up of the motor during acceleration of the belt. An oversized motor adds to the cost.

Also, since most conventional conveyor systems use a plurality of motors spaced apart along the system (known as multimotor drive), a direct linkage or coupling to similarly spaced apart drive shafts means that the respective motor rotor inertias are coupled by the conveyor system itself. This can lead to vibration related problems and difficulty in load sharing in the conveyor system.

A second type of drive system works on the basis of a constant speed electric motor connected through a variable fluid coupling to an output drive shaft. The variable fluid coupling is controllable by means independent of the motor. For instance, the variable fluid coupling may be of the scoop coupling type where the volume of oil within the coupling is varied over time by a scoop means. Variation in the oil volume within the scoop coupling will affect the output torque from the coupling that, in turn, will affect the torque on the output drive shaft. Other examples of independently controllable variable fluid couplings include the scoop trim coupling and the drain and fill coupling. It is a disadvantage of this type of coupling that it is mechanically complex and therefore prone to breakdown.

A third type of drive system includes the Foettinger type fixed-fill fluid coupling. This is the most simple of the three types whereby the coupling is normally driven by a squirrel cage type induction motor at relatively constant speed and produces an output torque which is a function of the coupling design, the type and fixed amount of oil within the coupling and the absolute speeds and relative speeds of the driving and driven parts of the coupling. However, all these variables must be determined prior to operation of the drive system and they remain fixed throughout the operation. It is therefore not possible to alter the characteristic output torque arising from such a coupling during its operation. This is a disadvantage in instances where it is desirable to change output torque during operation of the drive system in response to varying load factors and the like. It is a further disadvantage because the output torque in such drive systems is often less consistent than would be desirable owing to random fluctuations in external variables such as load.

It is an object of the present invention to overcome or substantially ameliorate the disadvantages of the prior art.

DISCLOSURE OF THE INVENTION

In one broad form of the invention there is provided a drive system, comprising:

(a) a drive shaft adapted for rotatable connection to a drive assembly;

(b) drive means for rotatably urging said drive shaft, said drive means including, in series,
 (i) a motor rotatably connected to a fluid coupling of the type whose output torque varies as a function of input shaft speed,
 (ii) said fluid coupling rotatably connected to the drive shaft, and (c) motor speed control means for controlling the output speed of the motor, whereby the output torque of said fluid coupling transmitted to the drive shaft responds in accordance with said output speed so as to cause the drive shaft to maintain a desired torque.

According to the invention there is provided a conveyor belt drive system adapted to move a conveyor belt, said system comprising:

(a) a drive shaft adapted for rotatable connection to a drive assembly of said conveyer belt;

(b) drive means for rotatably urging said drive shaft, said drive means including, in series,
 (i) a motor rotatably connected to a fluid coupling of the type whose output torque varies as a function of input shaft speed,
 (ii) said fluid coupling rotatably connected to the drive shaft, and (c) motor speed control means for controlling the output speed of the motor, whereby the output torque of said fluid coupling transmitted to said drive shaft responds in accordance with said output speed of said motor so as to cause the drive shaft to maintain a desired torque.

Preferably, the motor speed control means comprises a means for measuring the torque on the drive shaft and transmitting it in the form of an electronic signal, a programmable data reference bank for comparing the measured torque reflecting electronic signal with a desired torque reflecting electronic signal, and an electronically activated controller for varying the motor speed when the difference in the compared torque reflecting electronic signals is outside a predetermined value so as to cause the drive shaft to rotate at the desired torque.

Optionally, the torque on the drive shaft may be measured either directly or indirectly.

Preferably, the direct torque measurement means is a torque transducer.

In a further broad form of the invention there is provided a method for control of the output torque of a fluid coupling; said fluid coupling being of the type whose output torque varies as a function of input shaft speed;

said method comprising sensing said output torque and controlling said input shaft speed so as to maintain said output torque within a predetermined band.

Preferably said fluid coupling is a fixed-fill Foettinger coupling.

Preferably the step of controlling said input shaft speed is achieved by rotatably driving said input shaft with a squirrel cage electric motor to which electric power is supplied by way of a variable voltage controller.

BRIEF DESCRIPTION OF THE DRAWINGS

In order that the invention may be more readily understood and put into practical effect, reference will be made to the accompanying drawings wherein.

DETAILED DESCRIPTION OF PREFERRED EMBODIMENTS

Figure 1:
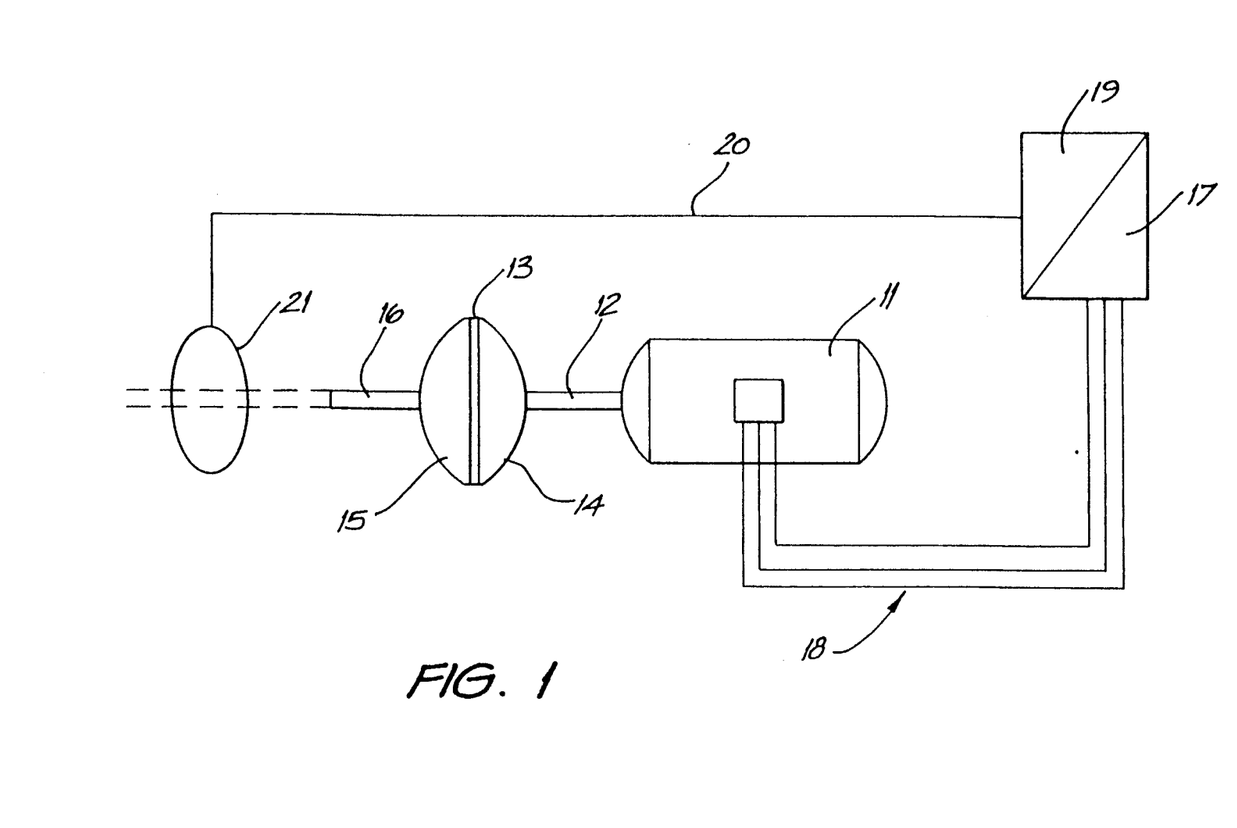
FIG. 1 is a schematic representation of a preferred drive system according to the invention.

By way of general introduction to the system illustrated in FIG. 1, the Foettinger type fixed-fill fluid coupling or equivalent is normally driven by a squirrel cage type induction motor at a relatively constant speed and produces an output torque which is a function of the coupling design, the type of oil and amount of oil in the coupling, and the absolute speeds and the relative speeds of the driving and driven parts of the coupling. It is known to refine or develop the design of the coupling and use measured quantities of specific oil to achieve the desired output torque characteristic of the coupling to suit specific applications such as starting and driving bolt conveyors. However, with this approach it is not possible to adjust the oil or the design once the coupling is in motion. The output torque from this arrangement is often less controlled than would be desirable. By contrast, embodiments of the invention of the present application enables couplings of less developed design to achieve a highly controlled torque output.

FIG. 1 illustrates the use of a motor speed controller 17 to control the speed of motor 11 so that the output torque of the oil-filled coupling 13 is also controlled, without any direct control of the coupling oil filling while the coupling is rotating. The torque downstream of the coupling is measured either directly or indirectly by means 21 and a signal transmitted to the controller 17 as a feedback signal. If the torque is lower than desired then the controller 17 increases the speed of the motor 11 so as to increase the output torque measured by means 21 until the desired torque level is achieved. Conversely, if the torque is higher than desired then the controller will reduce the motor speed to reduce the torque being transmitted.

The drive system of FIG. 1 has an electric motor 11 rotatably connected by shaft 12 to a fixed-fill Foettinger coupling 13. The coupling 13 has a drive part 14 and a driven part 15. The driven part 15 is rotatably connected to a drive shaft 16 for a driven assembly (not shown) such as a conveyor belt.

A motor speed control means controls the output speed of the motor 11 so as to cause the drive shaft 16 to maintain a desired torque.

This control is maintained, in the preferred embodiment, by a process of, in general terms, measuring the torque on the drive shaft 16, comparing the measured torque with the desired torque, and, where there is greater than a predetermined difference, varying the output speed of the motor so as to cause the drive shaft 16 to rotate at the desired torque.

In more detail, and with reference to FIG. 1, the motor speed control means includes a torque measurement means 21 that can measure the torque on the drive shaft 16 and can transmit an electronic signal reflecting the measured torque through electronic surveillance relay line 20. The said measurement means 21 preferably measures the torque on the drive shaft 16 directly, such as through a transducer. In certain circumstances, a load cell can be an appropriate transducer.

The measured torque reflecting signal is received at a programmable data reference bank 19, where it is compared with a desired torque reflecting signal programmed therein.

If there is a difference in the compared torque reflecting signals which is outside a predetermined value (so reflecting an unacceptable difference in the measured torque and desired torque on the drive shaft 16), an electronic signal reflecting that difference is passed to a variable frequency controller 17 which is activated to vary the frequency of the power supply through power supply lines 18 to the motor 11. The newly varied frequency of power supply to the motor 11 will correspondingly vary the output speed of the shaft 12 or motor 11 which, in turn, will cause the drive shaft 16 to rotate at the desired torque.

In effect this means that, if the torque of the drive shaft 16 is lower than desired, the controller 17 will increase the speed of the motor 11 to an extent that it will, through the drive means, increase the torque on the drive shaft 16 to the desired value. If the torque is higher than desired, the controller 17 will reduce the motor speed to reduce the torque being transmitted.

In this way, the motor speed control means acts as a feedback mechanism for maintaining the torque of the drive shaft 16 at the desired value.

It is also noted that the output torque from the driven part 15 of the coupling 13 is controlled exclusively by the speed of motor 11, rather than by any direct control of the oil volume within the coupling or other variables inherent in the coupling.

Figure 2:
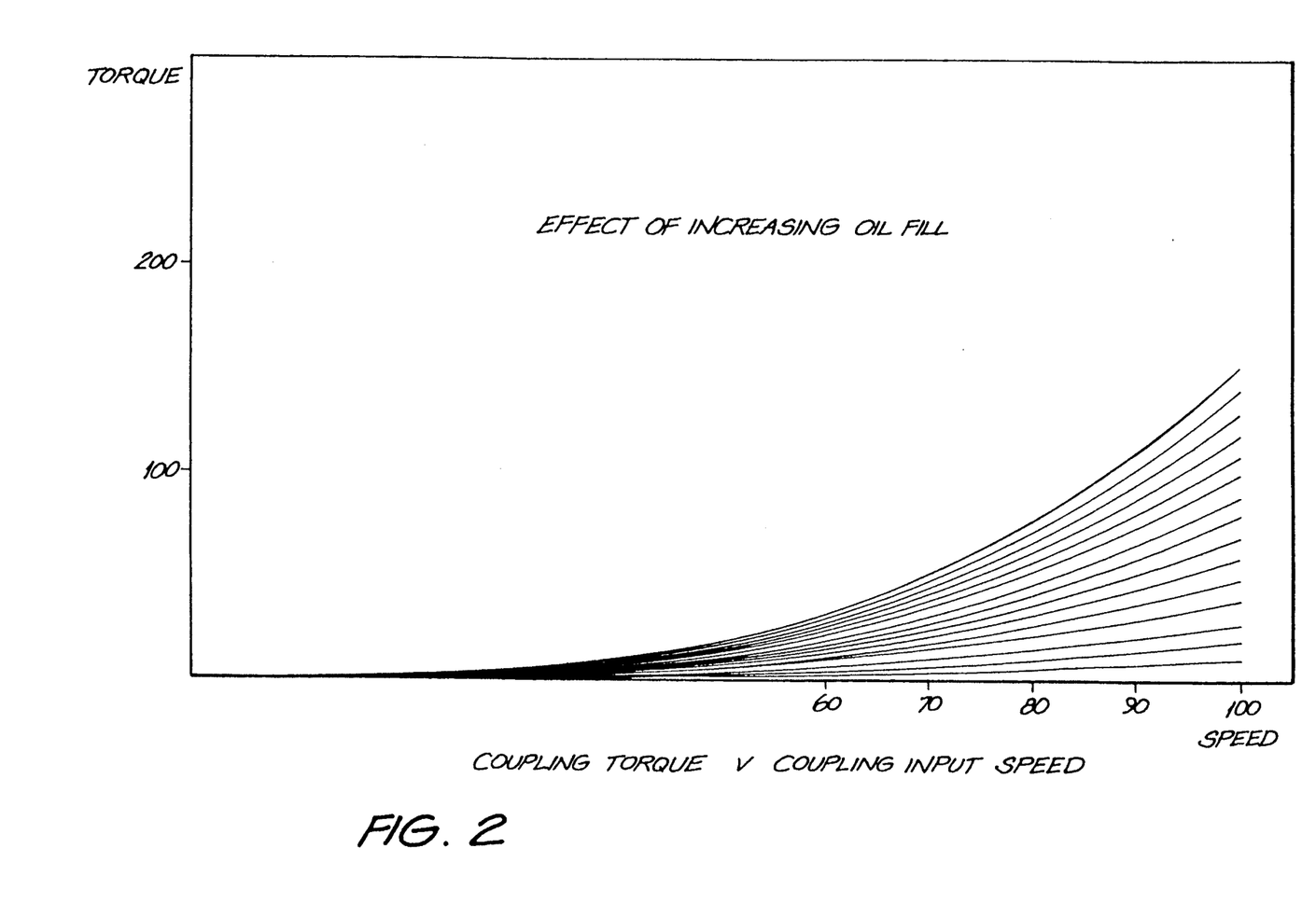
FIG. 2 illustrates a typical torque speed characteristic for the coupling included in the drive system of FIG. 1.

FIG. 2 illustrates the torque versus input shaft speed for a coupling such as that illustrated in FIG. 1 but is also applicable in respect of the second and third embodiments to be described with reference to FIGS. 3 and 6.

It will be noted that FIG. 2 indicates that for the type of fluid coupling proposed for use with the drive system of the present invention the effect of increasing the amount of oil in the coupling is to increase the output torque available from the coupling at any given speed. Furthermore, it can be seen that the torque versus speed characteristic becomes a power law characteristic as the amount of oil in the coupling increases whereby output torque, particularly near maximum input speed is of the order of a square or cubed law behaviour. That is, output torque is relatively sensitive to input speed when the coupling is operating at or near rated speed.

Figure 3:
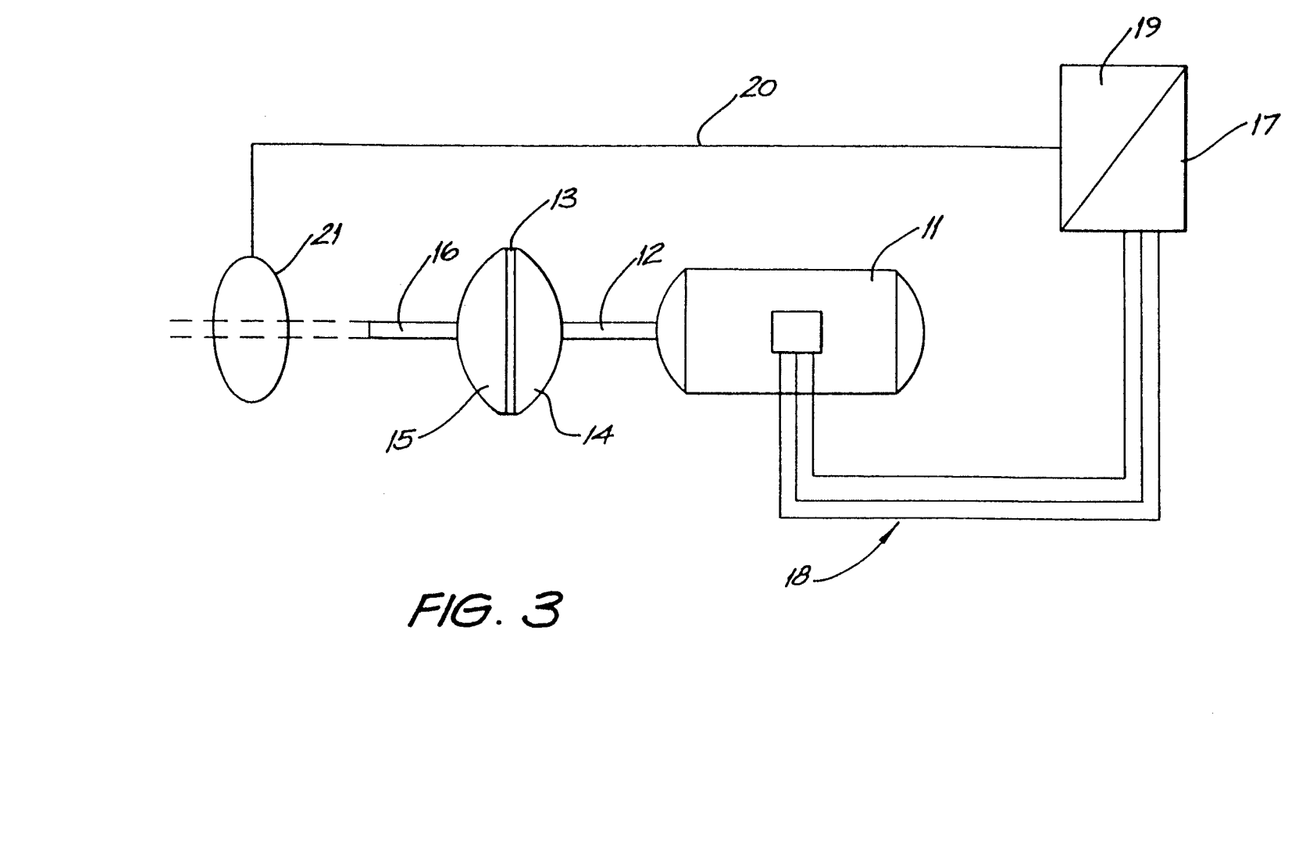
FIG. 3 is a schematic representation of a drive system according to a second embodiment of the invention.

FIG. 3 illustrates a drive system according to a second embodiment of the invention wherein like components are numbered as for the first embodiment described with reference to FIG. 1. The main difference between the second embodiment and the first embodiment is that a variable voltage electronic drive is used for controller 17 to control the voltage supplied to induction motor 11. This form of controller often uses SCR's as the power control elements and is of a relatively simple and rugged design. "Soft starters" for squirrel cage induction motors are usually of this construction and achieve the soft start characteristic by chopping the voltage wave form fed to the induction motor by means of the SCR's. These controllers do not vary the frequency of the output way form but only the average/RMS voltage supplied to the induction motor.

Figure 4:
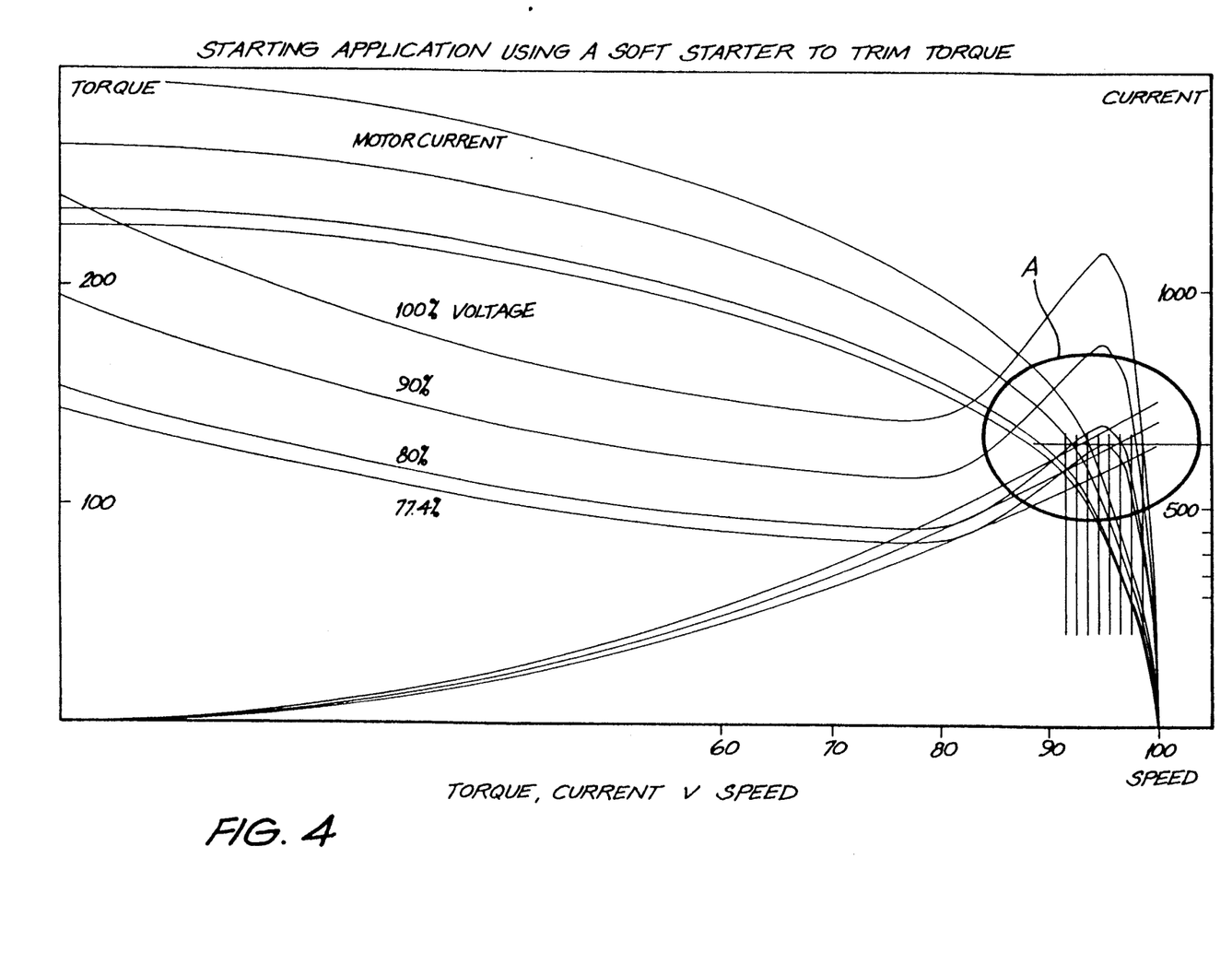
FIG. 4 illustrates the torque speed characteristic of the induction motor of the second embodiment of FIG. 3 at various input voltages.

The torque versus speed characteristic for a typical induction motor as used for induction motor 11 in FIG. 3 for various input voltages is shown in FIG. 4. It will be noted that at or near synchronous speed it is possible, by varying the input voltage to the motor, to switch across the torque versus speed characteristic so as to maintain output torque from the motor constant as graphically illustrated in the region A marked on FIG. 4. Of course the speed of the output shaft 12 from the motor 11 will vary about the synchronous speed of the motor. As illustrated in FIG. 2 the variation in output shaft 12's speed will have an effect on the output torque available from shaft 16 of the coupling 13. In fact, because of the square/cubed law characteristic of the coupling torque speed curve at or near operating speed only relatively small changes in speed of motor shaft 12 can have a significant effect on the torque exerted by output shaft 16.

Figure 5:
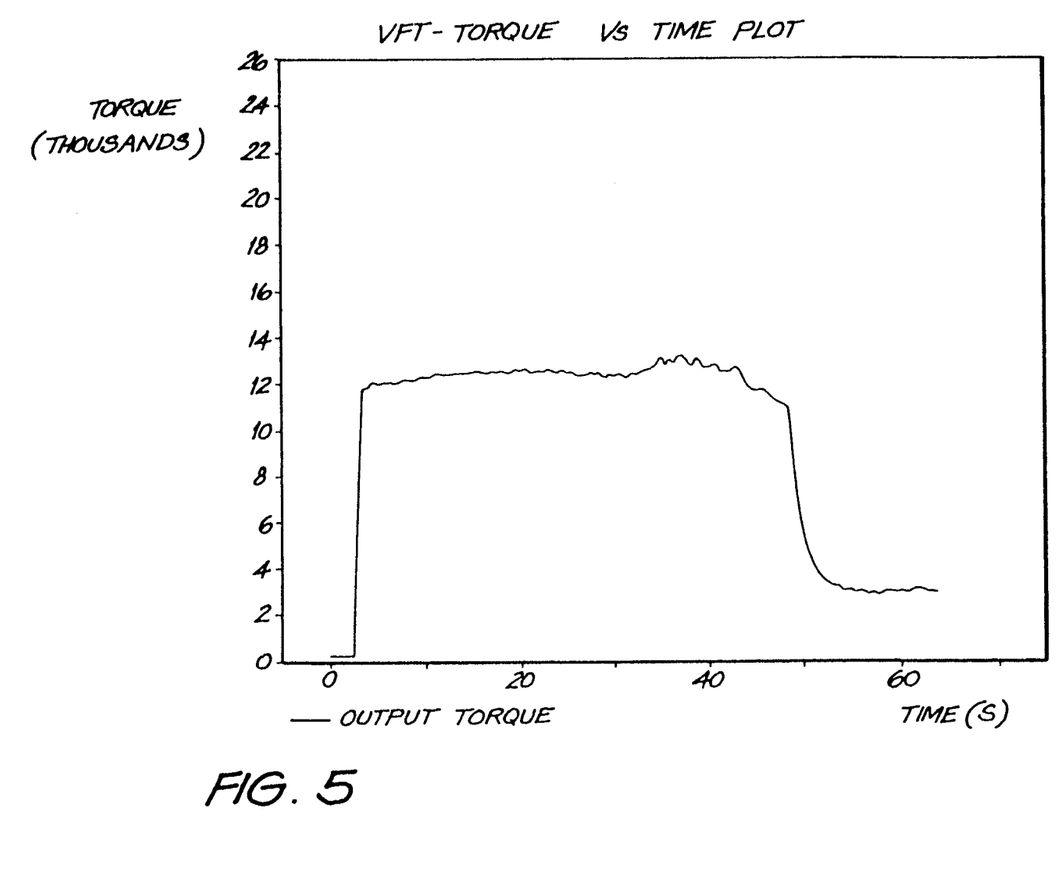
FIG. 5 illustrates output torque against time during start up of the drive system of the second embodiment of FIG. 3.

The result is that relatively small changes in the output voltage waveform from controller 17 can be used to trim the output torque available on shaft 16 to a relatively constant value during start up of the drive system. A typical output torque characteristic is illustrated in FIG. 5. The characteristic is achieved by programmable controller 19 adjusting the voltage output from SCR controller 17 so as to maintain a constant torque sensed by torque measurement means 21. The controller algorithm is relatively straight forward, simply requiring an increase in voltage to provide an increase in torque and vice versa.

Figure 6:
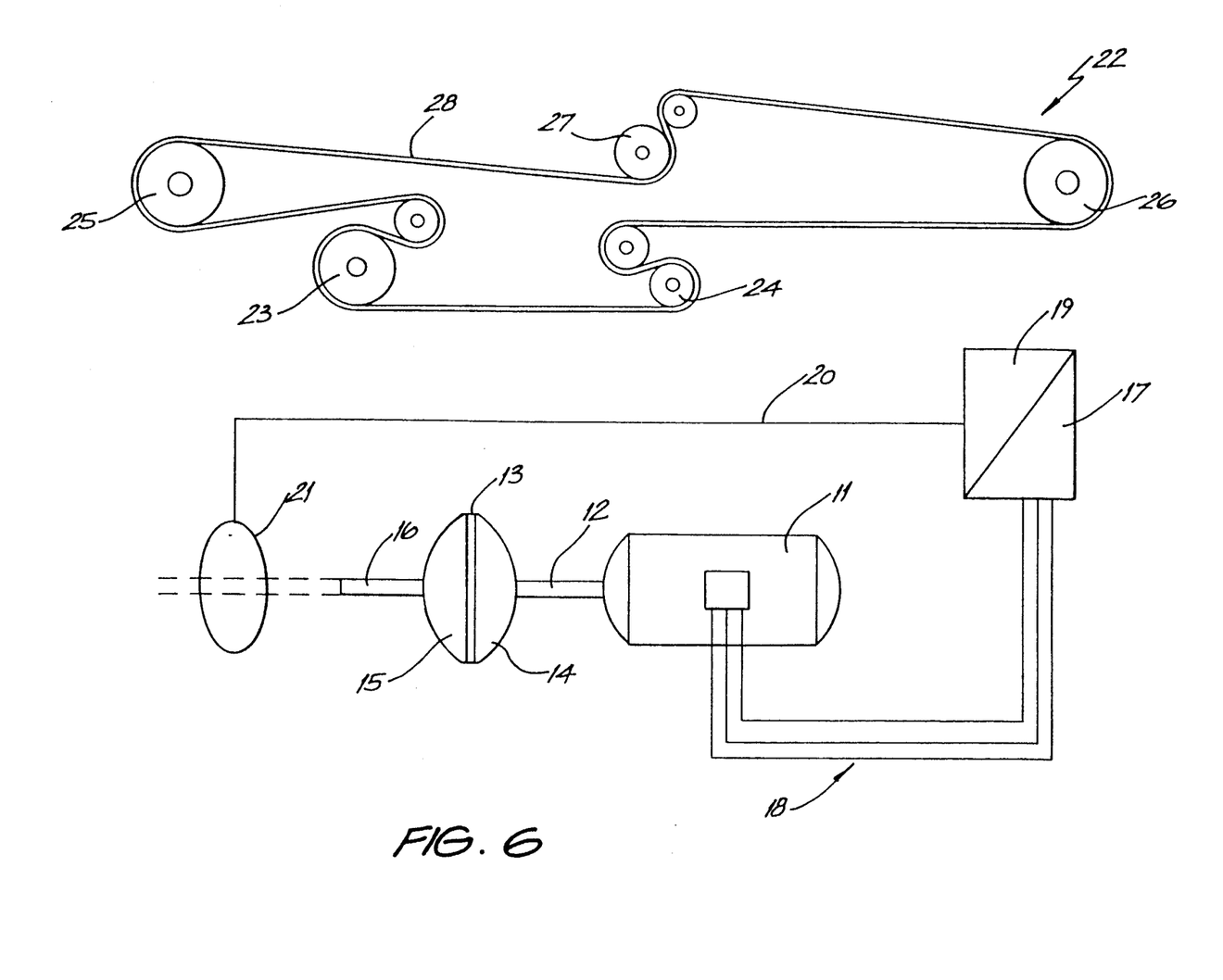
FIG. 6 is a schematic representation of a drive system according to a third embodiment of the invention utilised for dual conveyor drive systems and the like and, FIG. 7 illustrates the torque speed characteristic of the induction motor of the third embodiment of FIG. 6 for various input voltages.

FIG. 6 illustrates a drive system according to a third embodiment of the invention for particular use with conveyor system 22 as the second drive in a two drive system. Conveyor 22 has a first drive 23 a tensioner assembly 24, head pulley 25, tail pulley 26, and second drive 27.

For the purposes of analysis it is taken that first drive 23 is to control the speed of the belt 28 of the conveyor 22. In fact, it is important that second drive 27 does not seek to vary the speed of the conveyor belt 28 from that determined by drive 23 as otherwise differential tensions and belt slackness can be quickly created with damaging consequences.

Accordingly the drive assembly 27 of FIG. 6 requires a constant velocity drive shaft 16 for driving the appropriate pulleys of the conveyor.

Obviously, however, the torque exerted by drive shaft 16 must vary to match the load requirements of the belt in the localised area around drive 27.

Figure 7:
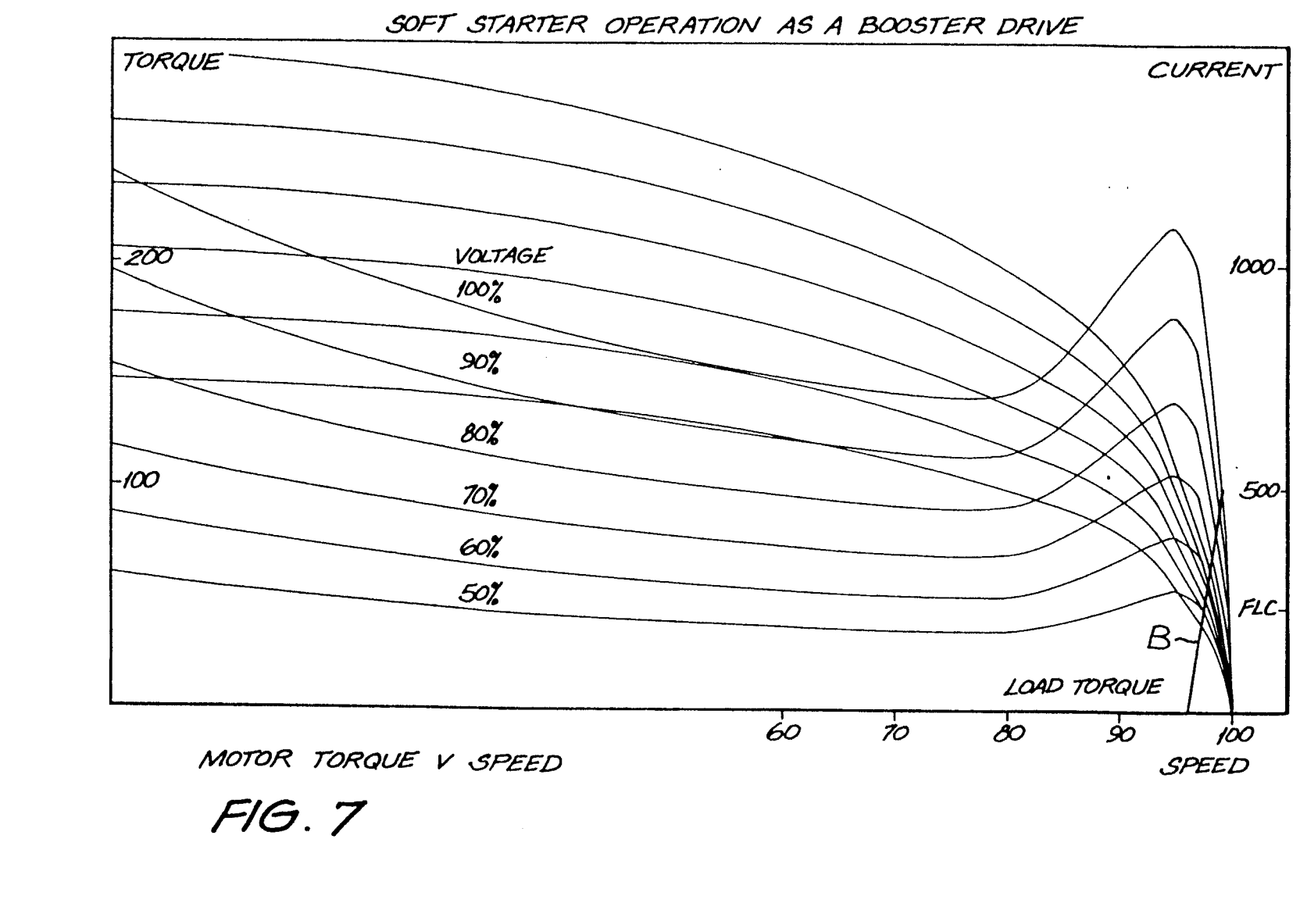

This is achieved according to the principles discussed in respect of the second embodiment of FIG. 3 however the difference for the third embodiment of FIG. 6 is that the motor speed characteristic is caused to lie along line B of FIG. 7 whereby relatively little speed variation of output shaft 12 takes place for a relatively large torque variation which is further amplified by the square/cubed law characteristic of the coupling 13 itself.

The end result is that output shaft 16 effectively maintains a rotational velocity determined by the conveyor belt 28 which, in turn, is determined by first drive 23. However the torque exerted by output shaft 16 is varied as required by the load on the conveyor 28 in the local area of second drive 27.

A particular advantage of this embodiment of the invention is its ability to be retro fitted to existing conveyor belt drives which frequently comprise an induction motor combined with a complicated control mechanism associated with the fluid coupling. In the case of a retro fit the coupling can be left on a fixed setting and an electronic voltage controller 17 complete with torque sensor 21 can be applied to the existing installation. In this way, existing capital investment is maintained and down time is minimised, but an improved control result is obtained.

Typical components comprising the system 27 of FIG. 6 include:

programmable logic controller: as available from supplies such as Siemens.

voltage controller: e.g. a sort starter or other SCR based motor voltage control device.

induction motor: squirrel cage type, typically in the range 5 kW to 1,000 kW.

fluid coupling: e.g. of the fixed-fill Foettinger type.

torque sensor: e.g. load cell.

The starting torque control available from the second embodiment can be combined with the steady state torque control aspects of the third embodiment in the one drive assembly for advantageous control of conveyor belt drives and the like, both as primary drives and as follower drives in multi-drive systems.

Various modifications may be made in details of design and construction without departing from the scope or ambit of the invention.

I claim:

1. A conveyor belt drive system adapted to move a conveyer belt, said system comprising:
   (a) a drive shaft adapted for rotatable connection to a drive assembly of said conveyor belt;
   (b) drive means for rotatably urging said drive shaft, said drive means including, in series.
      (i) a motor rotatably connected to a fluid coupling of the type whose output torque varies as a function of input shaft speed,
      (ii) said fluid coupling rotatably connected to the drive shaft, and
   (c) motor speed control means for controlling the output speed of the motor, whereby the output torque of said fluid coupling transmitted to said drive shaft responds in accordance with said output speed of said motor so as to cause the drive shaft to maintain a desired torque.

2. The drive system of claim 1 wherein the motor speed control means comprises a means for measuring the torque on the drive shaft and transmitting it in the form of an electronic signal, a programmable data reference bank for comparing the measured torque reflecting electronic signal with a desired torque reflecting electronic signal, and an electronically activated controller for varying the motor speed when the difference in the compared torque reflecting electronic signals is outside a predetermined value so as to cause the drive shaft to rotate at the desired torque.

3. The drive system of claim 2 wherein the torque on the drive shaft is measured either directly or indirectly.

4. The drive system of claim 3 wherein the direct torque measurement means is a torque transducer.

5. The drive system of claim 1 used as a follower drive in a multi-drive conveyor system.

6. A method for control of the output torque of a fluid coupling; said fluid coupling being of the type whose output torque varies as a function of input shaft speed;
    said method comprising sensing said output torque and controlling said input shaft speed so as to maintain said output torque within a predetermined band.

7. The method of claim 6 wherein said fluid coupling is a fixed-fill Foettinger coupling.

8. The method of claim 6 wherein the step of controlling said input shaft speed is achieved by rotatably driving said input shaft with a squirrel cage electric motor to which electric power is supplied by way of a variable frequency controller.

9. The method of claim 6 wherein the step of controlling said input shaft speed is achieved by rotatably driving said input shaft with a squirrel cage electric motor to which electric power is supplied by way of a variable voltage controller.

10. A drive system, comprising:
    (a) a drive shaft adapted for rotatable connection to a drive assembly:
    (b) drive means for rotatably urging said drive shaft, said drive means including, in series,
        (i) a motor rotatably connected to a fluid coupling of the type whose output torque varies as a function of input shaft speed,
        (ii) said fluid coupling rotatably connected to the drive shaft, and
    (c) motor speed control means for controlling the output speed of the motor, whereby the output torque of said fluid coupling transmitted to the drive shaft responds in accordance with said output speed so as to cause the drive shaft to maintain a desired torque.

* * * * *